(12) United States Patent
Bernard et al.

(10) Patent No.: US 10,760,696 B2
(45) Date of Patent: Sep. 1, 2020

(54) AIRCRAFT ENGINE FUEL CIRCUIT VALVE SLIDE

(71) Applicant: Safran Aircraft Engines, Paris (FR)

(72) Inventors: Clement Bernard, Moissy-Cramayel (FR); Loic Pora, Moissy-Cramayel (FR); Christophe Cebille, Moissy-Cramayel (FR)

(73) Assignee: Safran Aircraft Engines, Paris (FR)

( * ) Notice: Subject to any disclaimer, the term of this patent is extended or adjusted under 35 U.S.C. 154(b) by 17 days.

(21) Appl. No.: 16/095,154

(22) PCT Filed: Apr. 20, 2017

(86) PCT No.: PCT/FR2017/050940
§ 371 (c)(1),
(2) Date: Oct. 19, 2018

(87) PCT Pub. No.: WO2017/182759
PCT Pub. Date: Oct. 26, 2017

(65) Prior Publication Data
US 2019/0136987 A1    May 9, 2019

(30) Foreign Application Priority Data
Apr. 21, 2016 (FR) .................................. 16 53519

(51) Int. Cl.
*F16K 11/07* (2006.01)
*F15B 13/04* (2006.01)
(Continued)

(52) U.S. Cl.
CPC .......... *F16K 11/0708* (2013.01); *F02C 7/232* (2013.01); *F15B 13/0402* (2013.01);
(Continued)

(58) Field of Classification Search
CPC .. F16K 11/0708; F16K 47/08; F16K 31/0613; F02C 7/232; B64D 33/00;
(Continued)

(56) References Cited

U.S. PATENT DOCUMENTS 3,198,212 A    8/1965  Junck et al.
3,556,155 A *  1/1971  McWilliams .......... B62D 5/087
                                                137/625.69
(Continued)

FOREIGN PATENT DOCUMENTS

FR          2300275 A1      9/1976
WO      WO 80/00870 A1      5/1980

OTHER PUBLICATIONS

French Preliminary Search Report dated Jan. 10, 2017 in the corresponding French Application No. 1653519 (with Category of English Translation of cited document) 3 pages.

(Continued)

*Primary Examiner* — John Bastianelli
(74) *Attorney, Agent, or Firm* — Oblon, McClelland, Maier & Neustadt, L.L.P.

(57) ABSTRACT

A slide for a fuel circuit valve of an aircraft engine extending along a longitudinal axis, and comprising a narrowed intermediate portion extending between two cylindrical end portions, a first end portion being separated from the narrowed intermediate portion by a shoulder having a surface arranged overall perpendicular to the longitudinal axis, the narrowed intermediate portion including in turn, as an extension of the shoulder, at least one cylindrical portion, the shoulder comprising at least one groove which extends radially from the cylindrical surface of the first end portion, towards the longitudinal axis, and which forms a fuel recirculation area which provides the generation of a jet of fuel on the cylindrical portion of the narrowed intermediate portion, when fuel flows along the first end portion towards (Continued)

the narrowed intermediate portion and the second end portion.

7 Claims, 3 Drawing Sheets

(51) Int. Cl.
  *F02C 7/232* (2006.01)
  *F15B 13/00* (2006.01)
(52) U.S. Cl.
  CPC ... *F15B 2013/008* (2013.01); *Y10T 137/8671* (2015.04); *Y10T 137/86734* (2015.04)
(58) Field of Classification Search
  CPC ....... Y10T 137/8671; Y10T 137/86734; F15B 13/0402; F15B 2013/008
  USPC .......................... 251/366; 137/625.69, 625.3
  See application file for complete search history.

(56) References Cited

U.S. PATENT DOCUMENTS

| 3,630,230 | A | * | 12/1971 | Stahle | F16K 11/07 137/625.4 |
|---|---|---|---|---|---|
| 4,009,864 | A | | 3/1977 | Schexnayder | |
| 4,066,239 | A | | 1/1978 | Hall | |
| 4,122,868 | A | * | 10/1978 | Holloway | F16K 11/0708 137/625.3 |
| 4,463,660 | A | * | 8/1984 | Mucheyer | F15B 13/0402 137/596.13 |
| 4,941,508 | A | | 7/1990 | Hennessy et al. | |
| 6,397,890 | B1 | * | 6/2002 | Mickelson | F15B 13/0402 137/625.34 |
| 6,450,194 | B1 | * | 9/2002 | Wasson | F15B 13/0402 137/351 |
| 6,682,016 | B1 | | 1/2004 | Peroulakis | |
| 6,957,665 | B2 | * | 10/2005 | Shin | F15B 13/0402 137/625.69 |
| 2006/0000507 | A1 | * | 1/2006 | Rodriguez | F16K 11/07 137/15.18 |
| 2014/0026546 | A1 | | 1/2014 | Bacon et al. | |
| 2015/0252908 | A1 | * | 9/2015 | Nagasaki | F16K 11/0708 137/625.69 |

OTHER PUBLICATIONS

International Search Report dated Jul. 4, 2017 in PCT/FR2017/050940 (with Category of English Translation of cited document).
International Search Report dated Jul. 4, 2017, in PCT/FR2017/050940, filed Apr. 20, 2017.

* cited by examiner

AIRCRAFT ENGINE FUEL CIRCUIT VALVE SLIDE

GENERAL TECHNICAL FIELD

The present invention relates to the field of valves for the fuel circuit of an aircraft engine, of the spool/sleeve type. More precisely, the present invention relates to a spool for a valve of an aircraft engine fuel circuit.

PRIOR ART

Figure 1:
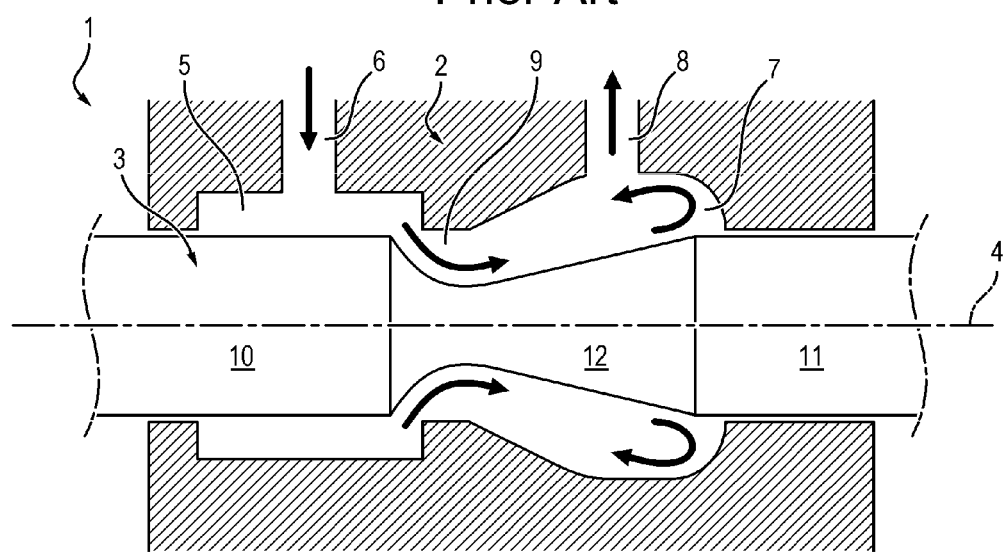

FIG. 1 illustrates an example of a valve 1 for the fuel circuit of an aircraft engine comprising a sleeve 2 at the interior of which is provided a spool extending along a longitudinal axis 4.

The sleeve 2 comprises a first chamber 5 provided with a fuel inlet 6 and a second chamber 7 provided with a fuel outlet 8, the first and the second chambers 5, 7 being connected to one another via a duct 9. The sleeve 2 also comprises two control chambers (not shown) allowing the induction of a displacement of the spool 3 along the longitudinal axis 4 depending on the pressure differential between these two chambers.

The spool 3 comprises a first cylindrical portion 10 extending into the first chamber 5, a second cylindrical portion 11 extending into the second chamber 7 and a third portion 12 connecting the first and second portions 10, 11 and at which the cross portion area of the spool 3 is narrowed. The spool 3 is displaced along the longitudinal axis 4 under the influence of a pressure differential between the two control chambers, between a closed position in which the first portion 10 of the spool 3 blocks the duct 9 so as to prevent the flow of fuel from the fuel inlet 6 to the fuel outlet 8, and an open position in which the first portion 10 of the spool 3 frees the duct 9 so as to allow the flow of fuel from the fuel inlet 6 to the fuel outlet 8.

Now with a valve 1 of this type, in the open position, the fuel flow does not have the same movement quantity between the fuel inlet 6 and the fuel outlet 8. In fact, the difference in the cross portion area between the first portion 10 and the third portion 12 generates, in the open position, a fuel jet which applies an additional load on the spool 3. This additional load, also called a "jet force" is particularly problematic because it includes an axial component which perturbs the control of the spool 3 by differential pressure. It will in fact be understood that any additional axial load applied to the spool 3 causes an error in the positioning of the spool 3 and consequently generates inaccuracies as to the flow rate of fuel at the outlet of the second chamber 7. The jet force is therefore harmful to the correct operation of the fuel circuit.

To avoid such inaccuracies, it is known for example from document WO 80/00870 to provide in the spool one or more grooves extending longitudinally, having a rounded longitudinal profile and the radius of curvature whereof is determined so that the fuel jet enters and leaves the groove while forming the same angle of approximately 69° with the longitudinal axis. This allows a reduction in the effects of the jet force on the spool. This reduction, however, is not sufficient to ensure the required accuracy for proper operation of the fuel circuit.

There is therefore a need to further limit the effects of jet forces on the spools of the aircraft engine fuel circuit.

PRESENTATION OF THE INVENTION

The present invention responds to this problem by proposing a spool for a valve of an aircraft engine fuel circuit which comprises a shoulder in which is provided a grooved forming a fuel recirculation zone, thus ensuring an inflow of the fuel jet generated by said shoulder on a cylindrical section of the spool, and consequently avoiding the generation of a load which would tend to displace it axially.

More precisely, the present invention has as its object a spool for a valve of an aircraft engine fuel circuit extending along a longitudinal axis, and comprising a narrowed intermediate portion extending between two cylindrical end portions, a first end portion being separated from the narrowed intermediate portion by a shoulder having a surface arranged perpendicular to the longitudinal axis overall, the narrowed intermediate portion itself including, as an extension of the shoulder, at least one cylindrical section, the shoulder comprising at least one groove which extends radially from the cylindrical surface of the first end portion, in the direction of the longitudinal axis, until the cylindrical section of the narrowed intermediate portion and which forms a fuel recirculation zone which ensures, when fuel flows along the first end portion in the direction of the narrowed intermediate portion and of the second end portion, that the fuel jet generated arrives on said cylindrical section.

The shoulder is provided with a step which is a protuberance protruding from said groove, so as to accelerate the recirculation of the fuel in the recirculation zone.

This shoulder protrudes with respect to said shoulder as an extension of the cylindrical surface of the first end portion which, when fuel flows along the first end portion in the direction of the narrowed intermediate portion and of the second end portion, ensures the generation of a fuel jet on the cylindrical section of the narrowed intermediate portion, a recirculation of fuel forming in a zone in front of said shoulder.

According to one embodiment, the step in particular extends substantially perpendicularly from the surface of the shoulder.

Preferably, the groove extends longitudinally from the shoulder on the cylindrical section of the narrowed intermediate portion and the groove has, at said cylindrical section, a flat bottom overall, the fuel jet generated by the groove reaching said cylindrical section at the bottom of said groove.

Preferably, the groove is provided with a step extending as an extension of the cylindrical surface of the first portion, so as to accelerate the recirculation of the fuel in the recirculation zone.

In one embodiment, this step extends substantially perpendicularly from the surface of the shoulder.

The invention also has as its object a valve for an aircraft engine fuel circuit, comprising a sleeve, in the interior of which is provided a spool as previously described, said sleeve comprising two control chambers between which the spool extends and an intermediate chamber provided with a fuel inlet and a fuel outlet in which the first and the second end portions and the narrowed intermediate portion of the spool extend, the spool being configured to be displaced relative to the sleeve under the influence of a pressure difference between the two control chambers, between a closed position in which the spool blocks the fuel inlet, and an open position in which the spool frees the fuel inlet.

The invention also has as its object an aircraft turbomachine fuel circuit comprising a valve as previously described.

The invention also has as its object an assembly including an aircraft turbomachine and a circuit of this type, as well as an aircraft comprising a turbomachine connected to a fuel circuit of this type.

PRESENTATION OF THE FIGURES

Figure 2:
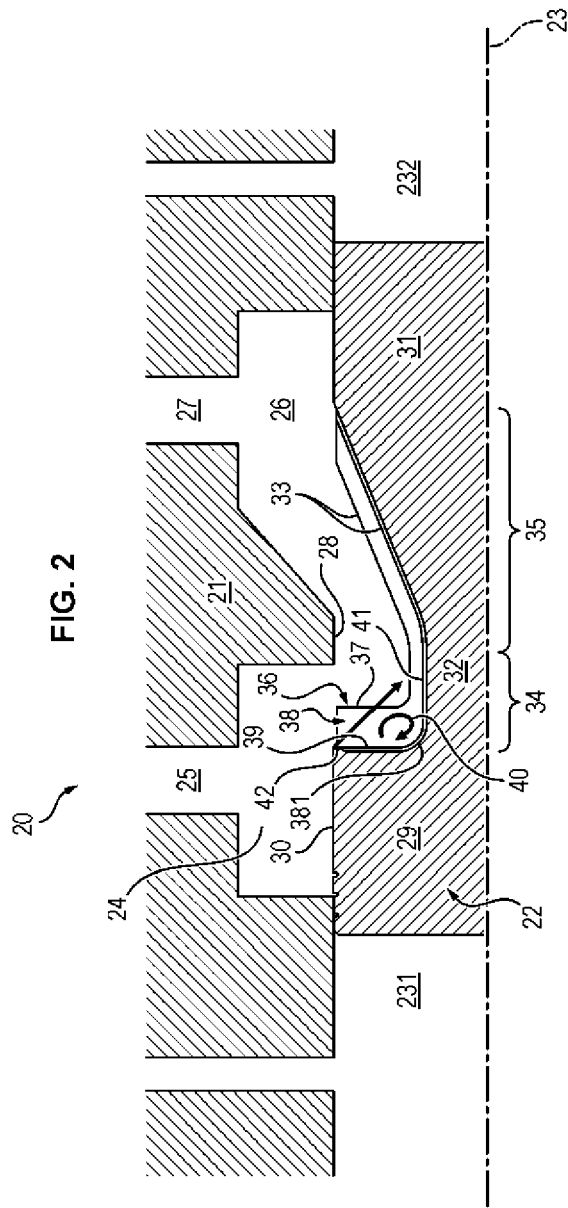
Figure 2A:
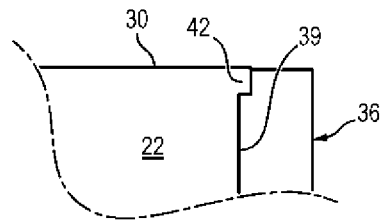
Figure 3:
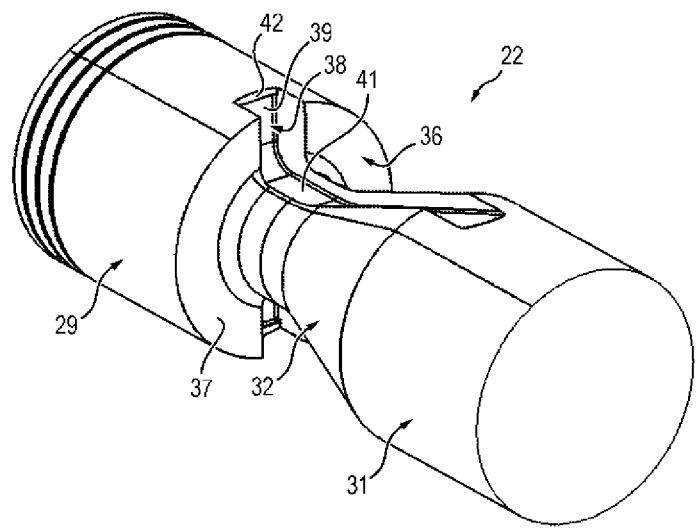
Figure 4:
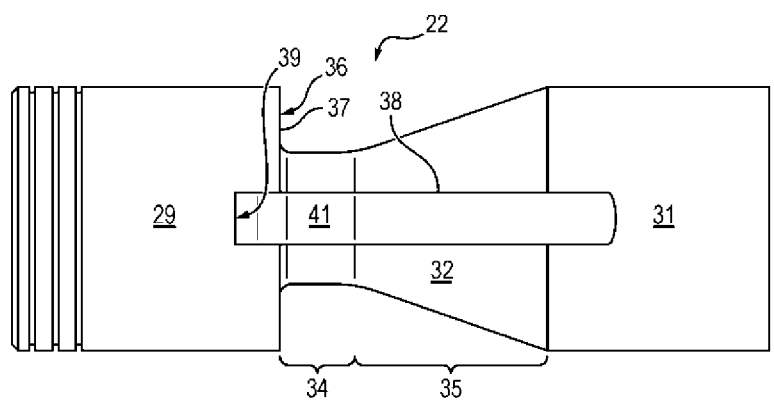

Other features, aims and advantages of the present invention will appear upon reading the detailed description that follows, and with reference to the appended drawings given by way of non-limiting examples and in which:

FIG. 1 shows a schematic view, in longitudinal portion, of a valve for an aircraft engine fuel circuit of the spool/sleeve type according to the prior art, FIG. 2 shows a partial schematic view, in longitudinal portion, of a valve for an aircraft engine fuel circuit of the spool/sleeve type according to one embodiment of the invention, FIG. 2a shows a detail view of the valve illustrated in FIG. 2, FIG. 3 shows a perspective view of the spool of the valve illustrated in FIG. 2, and FIG. 4 shows a front view of the spool illustrated in FIG. 3.

DETAILED DESCRIPTION

FIG. 2 illustrates an example of a valve 20 for an aircraft engine fuel circuit. The valve 20 comprises in particular a sleeve 21, in the interior of which is provided a spool 22 extending along a longitudinal axis 23.

The sleeve 21 comprises two control chambers 231, 232 allowing the induction of a displacement of the spool 22 along the longitudinal axis 23 depending on a pressure differential between these two chambers. The sleeve 21 also comprises an intermediate chamber formed from a first chamber 24 provided with a fuel inlet 25 and a second chamber 26 provided with a fuel outlet 27, the first and the second chambers 24, 26 being connected to one another via a duct 28.

The spool 22 extends between the two control chambers 231, 232, in the intermediate chamber.

The spool 22 comprises a narrowed intermediate portion 32 extending between two cylindrical end portions 29, 31, a first end portion 29 being separated from the narrowed intermediate portion 32 by a shoulder 36 having a surface 37 arranged perpendicularly overall with respect to the longitudinal axis 23. The narrowed intermediate portion 32 includes, as an extension of the shoulder 36, at least one cylindrical section 34. The narrowed intermediate portion 32 can also include a frustoconical portion 35 connecting the cylindrical section 34 to the second end portion 31 of the spool 22.

The spool 22 is displaced along the longitudinal axis 23 under the influence of the pressure differential between the two control chambers 231, 232, between a closed position in which the first end portion 29 of the spool 22 blocks the duct 28 so as to prevent the flow of fuel from the fuel inlet 25 to the fuel outlet 27, and an open position in which the first end portion 29 of the spool 22 frees the duct 28 so as to allow the flow of fuel from the fuel inlet 25 to the fuel outlet 27. In the open position, the sudden change of portion between the first end portion 29 and the narrowed intermediate portion 32 causes the generation of a fuel jet on the narrowed intermediate portion 32.

The shoulder 36 comprises at least one groove 38 which extends radially from the cylindrical surface 30 of the first end portion 29, in the direction of the longitudinal axis 23, until the cylindrical section 34. The groove 38 ensures a recirculation of the fuel in front of the shoulder (recirculation zone 40) and thus the generation of a fuel jet on the cylindrical section 34 of the narrowed intermediate portion 32, when fuel flows along the first end portion 29 in the direction of the narrowed intermediate portion 32 and of the second end portion 31. The groove 38 allows a reduction in the effect of fuel pressure on the spool 22.

The shoulder 36 is provided with a step 42 extending as the extension of the cylindrical surface 30 of the first end portion 29.

The step 42 is shown in more detail in FIG. 2a.

This step 42 is a protuberance protruding with respect to the shoulder 36. Its extends from the groove 38 and is preferably arranged over the entire length of said groove 38. It ensures a recirculation of the fuel in front of the shoulder (recirculation zone 40) and thus the generation of a fuel jet on the cylindrical section 34 of the narrowed intermediate portion 32, when fuel flows along the first end portion 29 in the direction of the narrowed intermediate portion 32 and of the second end portion 31. The step 42 allows a reduction in the effect of fuel pressure on the spool 22. The step 42 is shown in more detail in FIG. 2a.

The step 42 extends substantially parallel to the longitudinal axis 23 from the shoulder 36. In other words, the step 42 is arranged substantially perpendicularly to the shoulder 36 and to the surface 37 defining it. What is meant by "substantially parallel" or "substantially perpendicular" is parallel or perpendicular within the limits of error, i.e. within 10°. The groove 38 comprises a surface 39 disposed perpendicular overall to the longitudinal axis 23, set back from the surface 37 of the shoulder 36 with respect to the second end portion 31.

The fuel recirculation zone 40 thus formed is positioned below the fuel jet, that is between the fuel jet and the spool 22. The fuel vortices generated at the fuel recirculation zone 40 allow the angle with which the fuel jet arrives on the narrowed intermediate portion 32 to be limited, and thus ensures that the fuel jet arrives on the cylindrical section 34 and not on the frustoconical portion 35 of the narrowed intermediate portion 32. Moreover, the recirculation of the fuel allows a reduction in the effect of fuel pressure on the spool 22.

It will be understood that due to the cylindrical portion of the cylindrical section 34, the fuel jet does not apply to the cylindrical section 34 any axial load tending to displace the spool 22 longitudinally, and that in this case the only axial component applied to the spool 22 corresponds to frictional forces of the fuel. These frictional forces being negligible, the jet force is thus considerably limited. On the other hand, without the groove 38 and without the recirculation zone 40 the fuel jet would likely reach the frustoconical portion 35 of the narrowed intermediate portion 33, generating as a result an axial load perturbing the positioning of the spool 22. Furthermore, contrary to the prior art which tended to compensate the movement quantity gap between the valve inlet and outlet, the present invention tends not to generate any movement quantity gap between the inlet and exit 25, 27 of the valve 20.

By accelerating the recirculation of the fuel in the recirculation zone 40, the load generated by the fuel pressure in the recirculation zone 40 on the surface 39 of the groove 38 is limited. It is thus possible to further reduce the axial load generated on the spool 22 and in particular to compensate the frictional forces generated by the flow of fuel on the spool 22.

Preferably, the groove 38 extends longitudinally from the shoulder 36 to the cylindrical section 34 of the narrowed intermediate portion 32. The groove 38 has the effect of avoiding turbulence in the fuel flow, when the valve 20 is in the open position, and thus limiting the hammer phenomena of the spool.

The groove 38 has, at the cylindrical section 34, a flat bottom 41 overall, the fuel jet generated by the groove 38 reaching said cylindrical portion at the bottom 41 of said groove 38.

The spool 22 comprises for example two grooves 38 provided diametrically separated from one another.

The groove 38 also has a fillet 381 between the surface 39 of the groove 38 and the bottom 41 of said groove 38, configured to maintain the recirculation of the fuel in the recirculation zone 40. To this end, the filet 381 is dimensioned so as to maintain the recirculation of the fuel in the recirculation zone 40. The fillet 381 facilitates setting the fuel in motion at the recirculation zone 40 and hence the recirculation of the fuel in said recirculation zone 40.

The valve 20 and more specifically the spool 22 have the advantage of reducing the jet forces which are applied to the spool 22 by forming a fuel recirculation zone 40 by means of the groove 38 and by ensuring that the fuel jet generated by the shoulder 36 arrives on the overall cylindrical section 34 of the spool 22. The valve can thus prevent the fuel flow from applying an axial load on the spool 22.

The invention claimed is:

1. A valve for an aircraft engine fuel circuit, comprising:
   a sleeve; and
   a spool extending along a longitudinal axis, and comprising a narrowed intermediate portion extending between first and second cylindrical end portions, the first cylindrical end portion being separated from the narrowed intermediate portion by a shoulder having a surface arranged perpendicular to the longitudinal axis overall, the narrowed intermediate portion including, as an extension of the shoulder, a cylindrical section,
   said sleeve comprising two control chambers between which the spool extends and an intermediate chamber provided with a fuel inlet and a fuel outlet wherein the first and second cylindrical end portions and the narrowed intermediate portion of the spool extend, the spool being configured to be displaced relative to the sleeve under an influence of a pressure difference between the two control chambers, between a closed position wherein the spool blocks the fuel inlet, and an open position wherein the spool frees the fuel inlet,
   wherein the shoulder comprises a groove which extends radially from the cylindrical surface of the first cylindrical end portion, in a direction of the longitudinal axis, until the cylindrical section of the narrowed intermediate portion and which forms a fuel recirculation zone which ensures, when fuel flows along the first cylindrical end portion in a direction of the narrowed intermediate portion and of the second cylindrical end portion, that the fuel jet generated arrives on said cylindrical section.

2. An aircraft turbomachine fuel circuit comprising a valve according to claim 1.

3. An assembly including an aircraft turbomachine and a fuel circuit according to claim 2.

4. An aircraft comprising a turbomachine connected to a fuel circuit according to claim 2.

5. The valve for an aircraft engine fuel circuit according to claim 1, wherein the groove extends longitudinally from the shoulder on the cylindrical section of the narrowed intermediate portion, and
   wherein the groove has, at said cylindrical section, a flat bottom overall, the fuel jet generated by the groove reaching said cylindrical section at the bottom of said groove.

6. The valve for an aircraft engine fuel circuit according to claim 1, wherein the groove is provided with a step extending as an extension of the cylindrical surface of the first cylindrical end portion, so as to accelerate recirculation of the fuel in the fuel recirculation zone.

7. The valve for an aircraft engine fuel circuit according to claim 6, wherein the step extends substantially perpendicularly from the surface of the shoulder.

* * * * *